United States Patent
Kotani et al.

(10) Patent No.: US 10,359,209 B2
(45) Date of Patent: Jul. 23, 2019

(54) AIR CONDITIONING APPARATUS

(71) Applicant: Johnson Controls—Hitachi Air Conditioning Technology (Hong Kong) Limited, Hong Kong (CN)

(72) Inventors: Masanao Kotani, Tokyo (JP); Sachio Sekiya, Tokyo (JP); Shigeyuki Sasaki, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 355 days.

(21) Appl. No.: 14/769,225

(22) PCT Filed: Jun. 30, 2014

(86) PCT No.: PCT/JP2014/067304
§ 371 (c)(1),
(2) Date: Aug. 20, 2015

(87) PCT Pub. No.: WO2016/001958
PCT Pub. Date: Jan. 7, 2016

(65) Prior Publication Data
US 2016/0273794 A1   Sep. 22, 2016

(51) Int. Cl.
*F24F 11/30* (2018.01)
*F24F 11/83* (2018.01)
(Continued)

(52) U.S. Cl.
CPC .............. *F24F 11/83* (2018.01); *F24F 11/30* (2018.01); *F24F 11/77* (2018.01); *F25B 13/00* (2013.01);
(Continued)

(58) Field of Classification Search
CPC ....... F24F 11/0012; F24F 11/006; F25B 5/02; F25B 2313/0314; F25B 2700/21172; G05D 23/1934
See application file for complete search history.

(56) References Cited

U.S. PATENT DOCUMENTS 7,809,472 B1 * 10/2010 Silva .................... F24F 3/065
                                                165/200

FOREIGN PATENT DOCUMENTS

EP         2527757 A1 * 11/2012  ............ F24F 11/006
EP         2955463 A1 * 12/2015  .............. F25B 13/00
(Continued)

OTHER PUBLICATIONS

English Translation of JP2012154600A.*
English Translation of JPS62162834A.*

*Primary Examiner* — Christopher R Zerphey
*Assistant Examiner* — Schyler S Sanks
(74) *Attorney, Agent, or Firm* — Mattingly & Malur, PC (57) ABSTRACT

An air conditioning apparatus suppresses an increase in power consumption associated with a reduction in start-stop frequency of a compressor. The air conditioning apparatus includes an outdoor unit equipped with a compressor and a plurality of indoor units connected with the outdoor unit and has a control device that performs thermo-off and thermo-on control such that a suction air temperature of the indoor unit falls within a predetermined temperature range with a set temperature defined as a reference. The control device detects the suction air temperatures of the indoor units, and, in a case where a sum total of air conditioning capacities of the indoor units, the suction air temperatures of which are between the set temperature and the thermo-off temperature, is at least a predetermined value, makes at least one indoor unit, the suction air temperatures of which are between the (Continued)

set temperature and the thermo-off temperature, forcedly thermo-off.

15 Claims, 5 Drawing Sheets

(51) Int. Cl.
*F24F 11/77* (2018.01)
*F25B 13/00* (2006.01)
*F24F 11/56* (2018.01)
*F24F 110/12* (2018.01)
*F24F 11/61* (2018.01)
*F24F 110/10* (2018.01)
*F24F 11/84* (2018.01)

(52) U.S. Cl.
CPC .............. *F24F 11/56* (2018.01); *F24F 11/61* (2018.01); *F24F 11/84* (2018.01); *F24F 2110/10* (2018.01); *F24F 2110/12* (2018.01); *F25B 2313/005* (2013.01); *F25B 2313/006* (2013.01); *F25B 2313/0233* (2013.01); *F25B 2313/0292* (2013.01); *F25B 2313/0293* (2013.01); *F25B 2313/0294* (2013.01); *F25B 2313/02741* (2013.01); *F25B 2313/0314* (2013.01); *F25B 2313/0315* (2013.01); *F25B 2600/02* (2013.01); *F25B 2600/2513* (2013.01)

(56) References Cited

FOREIGN PATENT DOCUMENTS

| | | | |
|---|---|---|---|
| JP | S62162834 A | * | 7/1987 |
| JP | 2012-154600 A | | 8/2012 |
| JP | 2012154600 A | * | 8/2012 |
| WO | WO 2014122735 A1 | * | 8/2014 .............. F25B 13/00 |

* cited by examiner

AIR CONDITIONING APPARATUS

TECHNICAL FIELD

The present invention relates to an air conditioning apparatus.

BACKGROUND ART

The air conditioning apparatus is configured by connecting an outdoor unit equipped with a compressor with a plurality of indoor units and is operated such that a suction air temperature of each indoor unit reaches a set temperature that is set for each indoor unit. In such an air conditioning apparatus, although there is known the one that performs capacity control of the compressor conforming to an air conditioning load, when the air conditioning capability becomes excessive due to mismatching with the air conditioning load and so forth, it enters a start-stop state that operation and stop of the compressor are repeated.

Specifically, when the suction air temperature in each indoor unit is lowered and reaches a thermo-off temperature that is determined in accordance with the set temperature, for example, at the time of cooling operation, a corresponding indoor unit shifts from a thermo-on operation for performing an air conditioning operation to a thermo-off operation for stopping the air conditioning operation. Then, when the suction air temperature is raised by an indoor load and reaches a thermo-on temperature that is determined in accordance with the set temperature, the corresponding indoor unit shifts again to the thermo-on operation to lower the room temperature.

In such an air conditioning apparatus, it is necessary to stop the compressor in a case where all of the indoor units have entered the thermo-off operation and thereafter to restart the compressor when any of the indoor units shifts to the thermo-on operation. When the operation and stop of the compressor are repeated in this way, the power consumption is increased associated with start-stop of the compressor and the operation efficiency is lowered.

For such a problem, in Patent Literature 1, in reaction to that timings that the plurality of indoor units enter the thermo-off operation are liable to synchronize with one another, in particular, in a case where a plurality of the indoor units have been installed in a large space and in a case where the air conditioning loads in respective rooms coincide with one another, indoor thermo-timing changing control for changing a thermo-temperature width of any of the plurality of indoor units is performed. An indoor unit that is different from other indoor units in timing that it is made indoor thermo-off/indoor thermo-on is positively produced so as to continue the operation of at least one indoor unit in the plurality of indoor units by such control.

CITATION LIST

Patent Literature

Patent Literature 1: Japanese Unexamined Patent Application Publication No. 2012-154600

SUMMARY OF INVENTION

Technical Problem

However, in the air conditioning apparatus described in Patent Literature 1, for example, in a cooling operation, since an operation that the thermo-off temperature of the indoor unit is lowered is continued, the room temperature in the vicinity of the indoor unit concerned is lowered relative to the set temperature. Therefore, there is the possibility that the cooling load may be increased to increase the power consumption of the air conditioning apparatus. In addition, since it leads to continuous performance of a low-efficiency operation that is lowered in evaporating temperature, there is the possibility that the power consumption may be increased. In addition, there is the possibility that comfort may be impaired due to lowering of the thermo-off temperature.

The present invention proposes to provide an air conditioning apparatus that suppresses an increase in power consumption associated with a reduction in start-stop frequency of a compressor and has ensured comfort.

Solution to Problem

An air conditioning apparatus of the present invention includes an outdoor unit equipped with a compressor and a plurality of indoor units connected with the outdoor unit and has a control device that performs thermo-off control that a cooling operation or a heating operation is suspended when a suction air temperature reaches the thermo-off temperature and thermo-on control that the suspended cooling operation or heating operation is restarted when the suction air temperature reaches the thermo-on temperature such that the suction air temperature of the indoor unit falls within a predetermined temperature range with a set temperature defined as a reference, wherein the control device detects the suction air temperatures of the plurality of the indoor units, and, in a case where a sum total of air conditioning capacities of the indoor units the suction air temperatures of which are between the set temperature and the thermo-off temperature is at least a predetermined value, makes at least one indoor unit in the indoor units the suction air temperatures of which are between the set temperature and the thermo-off temperature forcedly thermo-off.

Advantageous Effects of Invention

According to the present invention, there can be provided the air conditioning apparatus that suppresses an increase in power consumption associated with a reduction in start-stop frequency of the compressor and has ensured comfort.

DESCRIPTION OF EMBODIMENTS

The air conditioning apparatus of the present invention includes the outdoor unit equipped with the compressor and the plurality of indoor units connected with the outdoor unit and has the control device that performs thermo-off control that the cooling operation or the heating operation is suspended when the suction air temperature reaches the thermo-off temperature and thermo-on control that the suspended cooling operation or heating operation is restarted when the suction air temperature reaches the thermo-on temperature such that the suction air temperature of the indoor unit falls within the predetermined temperature range with the set temperature defined as the reference, wherein the control device detects the suction air temperatures of the plurality of the indoor units, and, in a case where the sum total of air conditioning capacities of the indoor units the suction air temperatures of which are between the set temperature and the thermo-off temperature is at least the predetermined value, makes at least one indoor unit in the indoor units the suction air temperatures of which are between the set temperature and the thermo-off temperature forcedly thermo-off. In a case where the sum total of the air conditioning capacities of the indoor units the suction air temperatures of which are between the set temperature and the thermo-off temperature is at least the predetermined value, the indoor unit the suction air temperature of which is between the set temperature and the thermo-off temperature is made forcedly thermo-off so as to deviate a thermo-off cycle of the indoor unit concerned and thereby the start-stop frequency of the compressor can be reduced, and since it is not necessary to change the thermo-off temperature, an increase in power consumption associated with a reduction in start-stop frequency of the compressor is suppressed and the comfort can be ensured.

First Embodiment

Figure 1:
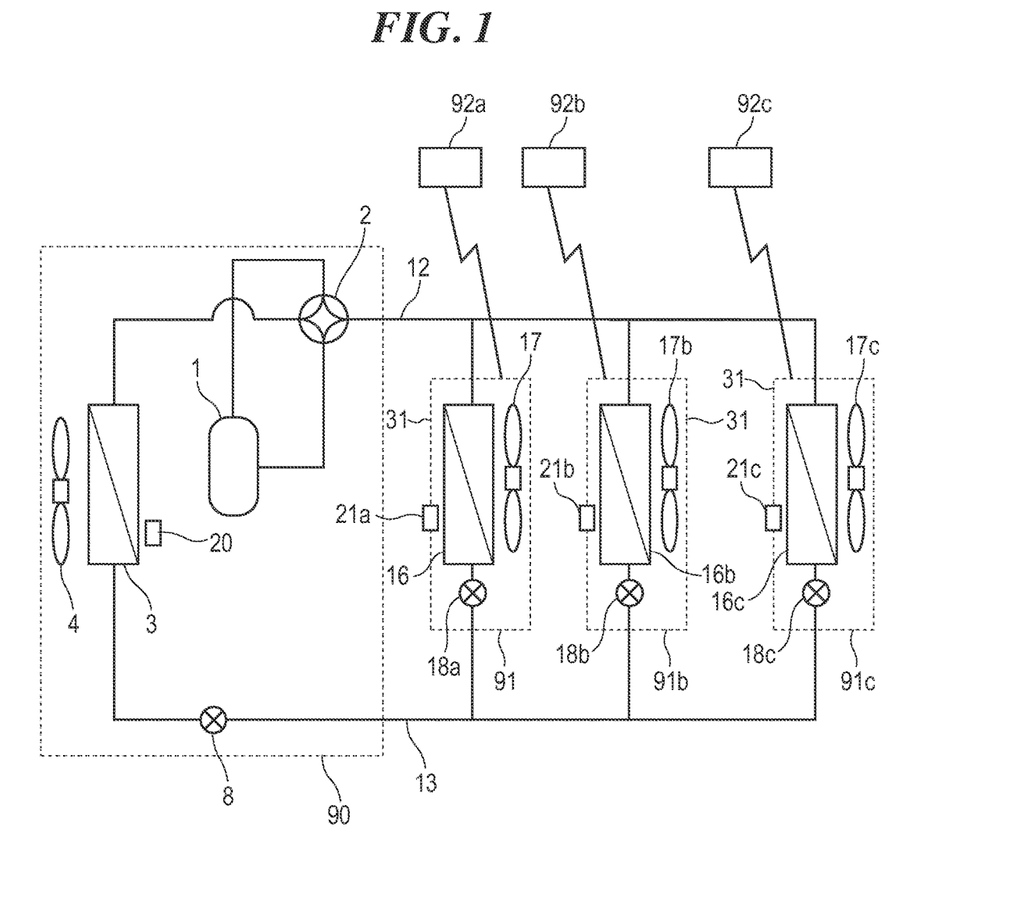
FIG. 1 is a cycle system diagram showing a configuration of an air conditioning apparatus of a first embodiment.

A first embodiment of the present invention will be described by using FIGS. 1 to 4. FIG. 1 is a cycle system diagram showing a configuration of an air conditioning apparatus in the present embodiment. In the present embodiment, an example that three indoor units (91a, 91b, 91c) have been connected to one outdoor unit 90 is shown. The present invention is not limited to such a configuration and both of the outdoor unit 90, the indoor units 91 may be different in number of connected units.

The three indoor units (91a, 91b, 91c) are to be connected in parallel with the outdoor unit 90 via a liquid pipe 13 and a gas pipe 12. The outdoor unit 90 is equipped with a compressor 1 that compresses a refrigerant, an outdoor heat exchanger 3 that performs heat exchange between outdoor air supplied by an outdoor fan 4 and the refrigerant, and a four-way valve 5 for switchingly connecting one of a suction port and a discharge port of the compressor 1 to the outdoor heat exchanger 3 and the other to the gas pipe 12. The other end of the outdoor heat exchanger 3 to be connected with the four-way valve 5 is to be connected to the liquid pipe 13 via an outdoor expansion valve 8.

In the indoor unit 91, one of an indoor heat exchanger 16 is connected to the gas pipe 12 and the other is connected to the liquid pipe 13 via an indoor expansion valve 18, suction air from an indoor space is supplied to the indoor heat exchanger 16 by an indoor fan 17. A remote controller 92 is connected to the indoor unit 91 and operation start and stop of the indoor units, designation of operation modes for cooling and heating, inputting of the set temperature and so forth are made possible by a user. The air conditioning capability of the air conditioning apparatus is determined on the basis of a temperature difference between the set temperature and a sensed temperature of a suction air temperature sensor 21.

Figure 2:
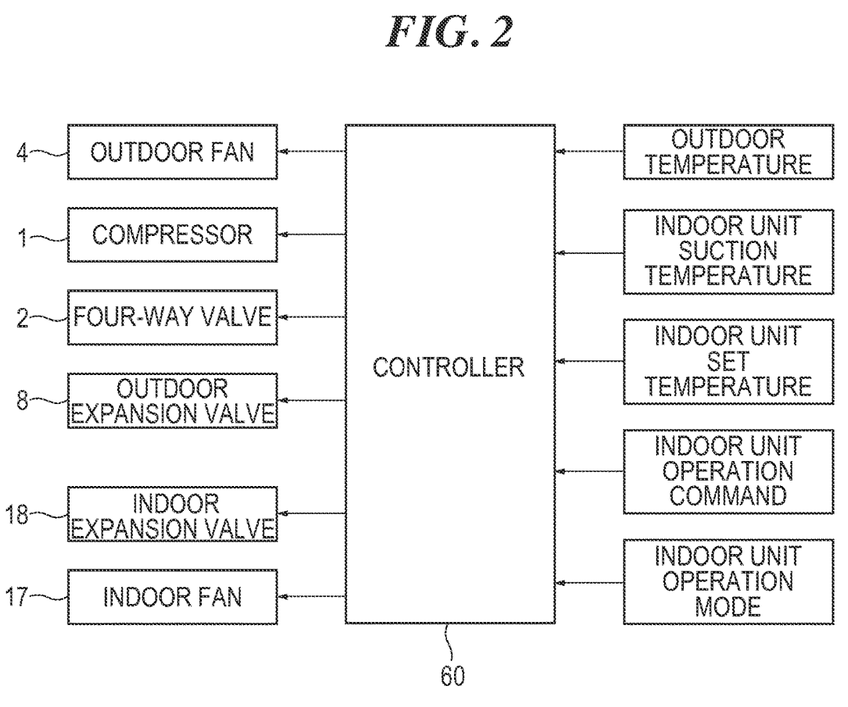
FIG. 2 is a diagram showing the configuration of the air conditioning apparatus of the first embodiment.

As shown in FIG. 2, when an operation start signal is input into a controller 60 from the remote controller 92, the operation of the air conditioning apparatus is started and a control signal is sent from the controller 60 to each of actuators of the outdoor unit 90 and the indoor units 91.

An operation will be described with regard to a case where there is a request for a cooling operation from a remote controller 92a. When there is the request for the cooling operation from the remote controller 92a, a four-way valve 2 is switched to a circuit shown by a solid line in the drawing so as to operate the outdoor fan 4 and an indoor fan 17a at predetermined rotation frequencies.

The refrigerant that has been compressed by the compressor 1 is condensed and liquefied by being heat-exchanged with the outdoor air by the outdoor heat exchanger 3. The liquefied refrigerant that has flown out into the liquid pipe 13 via the outdoor expansion valve 8 that is in a fully open state is pressure-reduced by an indoor expansion valve 18a to be low in temperature and low in pressure and flows into the indoor heat exchanger 16. The refrigerant that has absorbed heat from the indoor air evaporates and turns to an overheated gaseous refrigerant and flows out into the gas pipe 12. The indoor air that has been cooled by this action is supplied to the indoor space and the indoor space is cooled with it. The gasified refrigerant passes through the gas pipe 12 and returns to the compressor 1 via the four-way valve 2 in the outdoor unit 90. At this time, indoor expansion valves 18b, 18c are in fully closed states and indoor fans 17b, 17c are in stopped states.

In a case where there are operation start signals also from remote controllers 92b, 92c, also the indoor expansion valves 18b, 18c are appropriately adjusted in opening, the refrigerant in the liquid pipe 13 is pressure-reduced and flows into indoor heat exchangers 16b, 16c and is subjected to heat exchange with the indoor air that has been supplied by the indoor fans 17b, 17c. The evaporated gaseous refrigerant with which the refrigerants that have evaporated in the indoor units 91, 91b, 91c are joined in the gas pipe 12 returns to the outdoor unit 90.

On the other hand, in a case where there are requests for the heating operation from the remote controllers 92a, 92b, 92c, the four-way valve is switched to a circuit shown by a broken line in FIG. 1 so as to operate the outdoor fan 4 and the indoor fan 17 at the predetermined rotation frequencies. The refrigerant that has been compressed by the compressor 1 flows into the indoor heat exchangers 16a, 16b, 16c through the gas pipe 12. In the indoor heat exchanger 16, the refrigerant is condensed and liquefied and on the other hand the indoor space is heated by radiating heat to the indoor air supplied by the indoor fan 17. After joined in the liquid pipe 13, the condensed liquefied refrigerant turns to the low-temperature/low-pressure refrigerant by being pressure-reduced by the outdoor expansion valve 8 and evaporates by receiving heat from the outdoor air in the outdoor heat exchanger 3. Thereafter, it returns to the compressor 1 via the four-way valve 2 and repeats again the process that it is compressed.

An operation at the time of cooling in such an air conditioning apparatus will be described in detail.

The rotation frequency of the compressor 1 is controlled such that a suction air temperature (Tr1) that a suction thermistor 21 of each indoor unit 91 has sensed becomes equal to a set temperature (Ts1) set by the remote controller. However, in a case where the capability of the air conditioning apparatus is excessive relative to an indoor load, in a case where the indoor load is smaller than the capability of the air conditioning apparatus when operated by a lower limit capability of the compressor 1 and so forth, a suction air temperature (Tr) of the indoor unit 91 may become lower than the set temperature.

In such a case, the thermo-off operation that the indoor expansion valve 18 of the indoor unit 91 is closed to suspend the cooling operation is performed. In this case, since the refrigerant is no longer supplied to the indoor heat exchanger 16, a cooling action by evaporation of the refrigerant ceases. Accordingly, the room temperature is gradually increased by the load of the indoor space. Then, when the suction temperature is increased up to a predetermined temperature, the indoor expansion valve 18 is again opened to restart the thermo-on operation.

Figure 3:
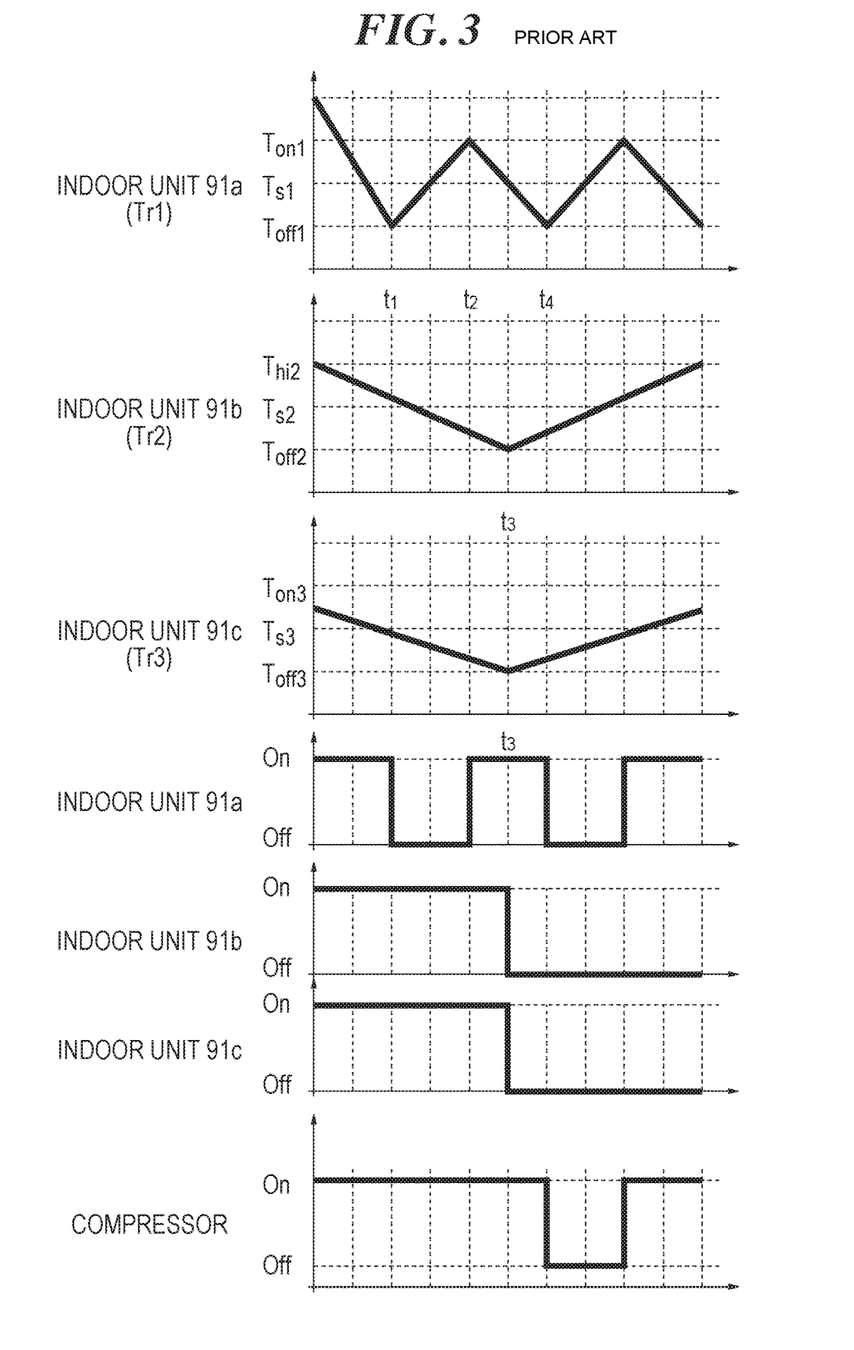
FIG. 3 is a diagram showing a control operation in a conventional air conditioning apparatus.

FIG. 3 is a diagram schematically showing a control operation in a conventional air conditioning apparatus. The horizontal axis indicates a time, the vertical axis indicates room temperatures (the suction air temperatures (Tr)) of the indoor units 91a, 91b, 91c, states of the thermo-on operation and the thermo-off operation and the operation state of the compressor.

The indoor unit 91 enters the thermo-off operation that suspends the cooling operation when the suction air temperature (Tr1) reaches a thermo-on lower limit value (Toff1) (a thermo-off temperature) and thereafter enters the thermo-on operation that restarts the suspended cooling operation when the temperature is increased and reaches a thermo-off upper limit value (Ton1) (a thermo-on temperature) such that the suction air temperature falls within a predetermined temperature range with the set temperature defined as a reference. In the present embodiment, it is assumed that Ton1 is +1° C., Toff1 is −1° C. relative to the set temperature, and a temperature width is 2° C. Incidentally, with respect to the widths of Ton1 and Toff1 relative to the set temperature and conditions when making it thermo-on or thermo-off, the present embodiment is one example and conditions such as the time and so forth may be added not limited to the suction air temperature (Tr).

As shown in FIG. 3, the controller 60 starts sampling (the controller 60 detects the suction air temperature of the indoor unit 91 at a predetermined timing and decides in which one of an area I (Toff<Tr≤Ts)/an area II (Ts<Tr≤Ton) each indoor unit 91 is and so forth). Although at the start of sampling, all of the three indoor units 91 operate, since the suction air temperature (Tr1) of the indoor unit 91a has reached the lower limit value (Toff1) at a time (t1), the indoor unit 91a enters the thermo-off operation. Thereafter, the operation is continued by the two indoor units 91b, 91c, the indoor unit 91a reaches the upper limit value (Ton1) and enters the thermo-on operation at a time (t2), and the indoor units 91a, 91b, 91c operate simultaneously. When a time (t3) comes and the indoor units 91b, 91c reach lower limit values (Toff2, Toff3), the indoor units 91b, 91c enter the thermo-off operation. Then, at a time (t4), the indoor unit 91a again reaches the thermo-off temperature (Toff1) and enters the thermo-off operation.

In this case, since all of the indoor units 91a, 91b, 91c enter the thermo-off operation, also the compressor 1 enters the stop state. When the times that the plurality of indoor units 91a, 91b, 91c enter the thermo-off operation accidentally coincide with one another in this way, the compressor 1 is stopped. When the compressor 1 is stopped, such an energy loss that a high-temperature refrigerant and a low-temperature refrigerant are mixed together and so forth is generated and therefore the power consumption increases more than the operation with no stop.

Therefore, in the present embodiment, an operation area of the indoor unit is separated into the area I of Toff<Tr≤Ts and the area II of Ts<Tr≤Ton and a decision means that detects and decides in which one of the areas I, II states of the suction air temperatures (Tr) of the indoor units 91a, 91b, 91c are present is provided so as to decide whether the indoor units 91a, 91b, 91c are made thermo-off synchronously.

For example, in a case where a sum total of the air conditioning capacities of the indoor units 91a, 91b, 91c that belong to the area I has exceeded a fixed threshold (it may be the number of units and the rate and, for example, it can be set as two units or 60% and so forth), it can be decided such that at the next sampling, some indoor units 91 of the indoor units 91a, 91b, 91c will reach the thermo-off temperature (Toff) synchronously. Incidentally, in the present embodiment, it is assumed that the capacity control lower limit value of the outdoor unit is 30%.

In a case where such a situation has occurred, the indoor unit 91 that belongs to the area I is made forcedly thermo-off. However, since when all of the indoor units 91 that belong to the area I are made forcedly thermo-off, there is the possibility that the compressor may be stopped, the compressor may be stopped, in the indoor units 91 that belong to the area I and the indoor units 91 that are in the vicinity of the set temperature (Ts), the ones are made forcedly thermo-off by the number of units not becoming less than the lower limit value of the air conditioning capacity of the outdoor unit 90. Incidentally, the thermo-off cycle can be further greatly deviated from those of other indoor units 91 that belong to the area I by making the indoor unit 91 that belongs to the area I and is in the vicinity of the set temperature (Ts) (for example, the indoor unit 91 the suction air temperature of which is the closest to the set temperature (Ts)) forcedly thermo-off.

In order to discriminate the indoor unit 91 that has been made forcedly thermo-off from other indoor units 91, a flag (F1) is set for it and the controller 60 stores the flag. As for the indoor units 91 for which the flag (F1) has been set, in a case where the air conditioning capacities of the indoor units 91 that are present in the area I have exceeded the threshold value at the time of subsequent sampling, the indoor unit 91 that is in the area II in the indoor units 91 for which the flag (F1) is set is made forcedly thermo-on. Thereby, stop of the compressor caused by a reduction in capacity of the indoor unit is avoided.

As for the flag (F1), in a case where it has reached the thermo-on temperature (Ton) or in a case where it has been made forcedly thermo-on, the flag is changed to a flag (F3) and the controller 60 stores it. In a case where the flags of all of the indoor units that are in operation have been changed to F3, the flag in the controller 60 is reset. The indoor unit 91 the flag of which is F3 (the indoor unit 91 that has ever been made forcedly thermo-off) does not perform forced thermo-on operation even when it belongs to the area I. That the same indoor unit performs the forced thermo-off operation repetitively can be avoided by managing the flags of the indoor units by the controller 60 as mentioned above.

As described above, also in a case of managing the flags (F1, F3), in a case where the capacity of the indoor unit that belong to the area I exceeds the threshold value and in a case where the indoor units 91 for which the flags (F1, F3) are not set are not present in the area I, in the indoor units 91 for which the flags (F1, F3) are not set, the indoor units that belong to the area II and the indoor units 91 the suction air temperatures (Tr) of which are in the vicinity of the set temperature (Ts) are made forcedly thermo-off by the number of units not becoming less than the capacity lower limit value of the outdoor unit 90.

A flag (F2) is set for the indoor unit 91 that has been made forcedly thermo-off and the controller 60 stores it. In a case where it has been made forcedly thermo-on or in a case where it has reached the thermo-on (Ton) degree, also the flag F2 is changed to the flag F3 similarly to the flag F1.

Such a specific example that the decision means and the flags are managed so as to deviate the cycles of the thermo-on/off operations of the indoor units 91 as above will be described by FIG. 4.

Figure 4:
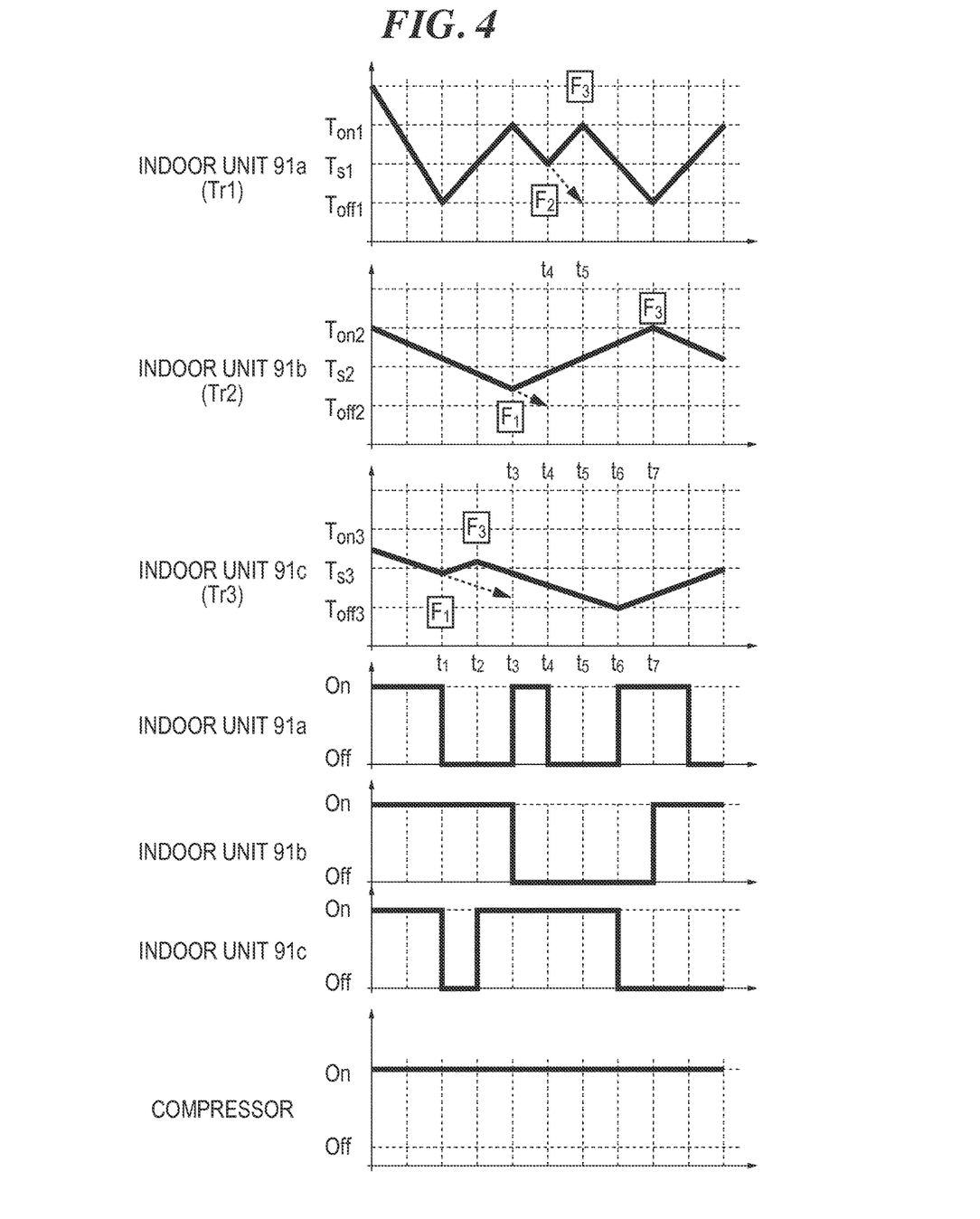
FIG. 4 is a diagram showing a control operation in the air conditioning apparatus of the first embodiment.

FIG. 4 is a diagram showing an embodiment that phases of the indoor units 91a, 91b, 91c having the same thermo-on/off cycles as those in FIG. 3 are deviated by the present invention so as to avoid stop of the compressor.

First, at the time t1, since the indoor units 91a, 91c belong to the area I, the controller 60 decides that they exceed the threshold value of the capacity that is present in the area I. The indoor unit 91c that is in the vicinity of the set temperature (Ts) is made forcedly thermo-off and the flag F1 is set for the indoor unit 91c and the controller 60 stores it. At this time, since the indoor unit 91b is in operation, the compressor 1 is not stopped.

At the time t2, since the indoor units 91a, 91b are present in the area I, the indoor unit 91c is made forcedly on, the flag F3 is set for it, and the controller 60 stores it. The phase of the thermo-cycle of the indoor unit 91c is deviated.

At the time t3, since the indoor units 91b, 91c are present in the area I, the indoor unit 91b is made forcedly thermo-off and the controller 60 stores the flag F1. At this time, since the indoor unit 91a is in operation, the compressor 1 is not stopped.

At a time t4, since the indoor units 91b, 91c are present in the area I and the flags F1, F3 are stored for the indoor units 91b, 91c by the controller 60, the indoor unit 91a that is in the area II is made forcedly thermo-off. The flag F2 is set for the indoor unit 91a and is stored by the controller 60.

At a time t5, the indoor unit 91a reaches the thermo-on temperature (Ton1). The flag F3 is set for the indoor unit 91a and it performs the thermo-on operation.

At a time t7, the indoor unit 91b reaches the thermo-on temperature (Ton2) and performs the thermo-on operation. At this time, the flag of the indoor unit 91b is changed to F3. Since the number of the flags F3 coincides with the number of indoor units that are in the operation, the flag F3 is reset.

As described above, the operation that the indoor units are made thermo-off synchronously to stop the compressor 1 can be avoided by controlling the indoor units 91a, 91b, 91c and managing the flags.

As a result, an increase in power consumption of the air conditioning device associated with start-stop of the compressor can be suppressed while ensuring the comfort.

Incidentally, although in the present embodiment, only the operation at the time of cooling operation is described, synchronous occurrence of thermo-off of the indoor units 91a, 91b, 91c can be avoided by the same operation also at the time of heating operation.

Second Embodiment

Figure 5:
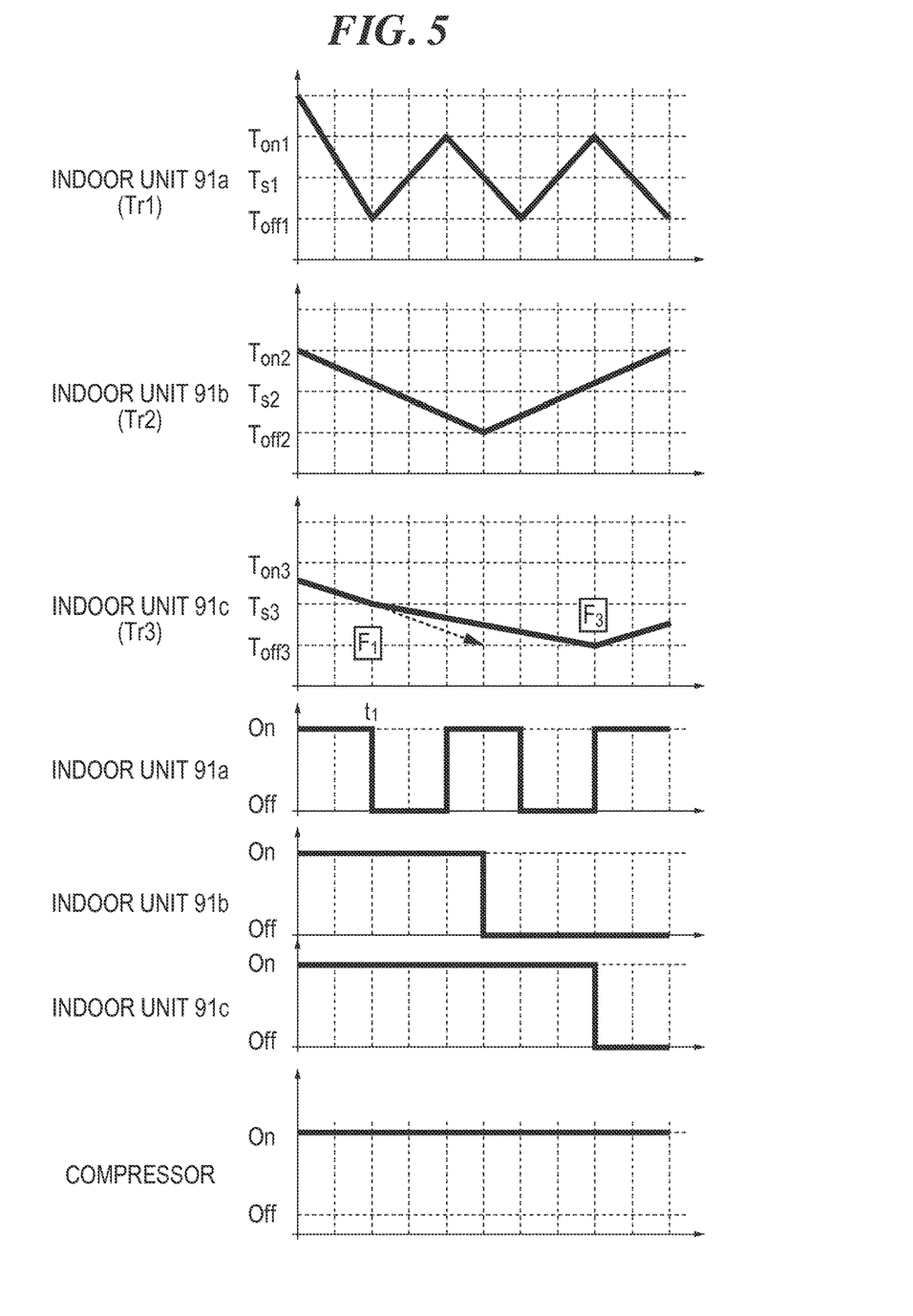
FIG. 5 is a diagram showing a control operation in an air conditioning apparatus of a second embodiment.

Next, a second embodiment will be described using FIG. 5. FIG. 5 is a diagram showing a control operation of an air conditioning machine in the second embodiment. Since the basic operations relative to the areas I, II and the flags are the same as those in the case of FIG. 4, detailed description thereof is omitted.

Similarly to FIG. 4, at the time t1 that the indoor unit 91 that is in the state of the area I exceeds the threshold value, the indoor unit 91c sets the flag F1. At this time, an outlet target SH of the indoor unit 91c is changed to tighten the throttle of the expansion valve 18c. As a result, the flow rate of the refrigerant that flows through the indoor unit 91c can be reduced and the cooling capability exhibited by the indoor unit 91c can be reduced. Accordingly, a gradient of time-dependent change in suction air temperature (Tr3) of the indoor unit becomes small and the phase of thermo-off of the indoor unit 91c can be deviated.

LIST OF REFERENCE SIGNS

60: controller
91: indoor unit

The invention claimed is:

1. An air conditioning apparatus, comprising:
an outdoor unit equipped with a compressor;
a plurality of indoor units connected with the outdoor unit;
a controller configured to:
detect respective suction air temperatures for each of the plurality of indoor units,
determine, for each of the plurality of indoor units, if the respective suction air temperature reaches a thermo-off temperature for a cooling operation and if the respective suction air temperature reaches the thermo-off temperature for the cooling operation, suspend the cooling operation,
determine, for each of the plurality of indoor units, if the respective suction air temperature reaches a thermo-on temperature for the cooling operation and if the respective suction air temperature reaches the thermo-on temperature for the cooling operation, begin the cooling operation, and
determine a sum of each of the plurality of indoor units for which the respective suction air temperature is less than or equal to a predefined temperature and greater than the thermo-off temperature and if the sum is greater than or equal to a predetermined value, determine a first one of the plurality of indoor units whose respective suction air temperature is closest to the predefined temperature among the plurality of indoor units for which the respective suction air temperature is less than or equal to the predefined temperature and greater than the thermo-off temperature, and forcibly suspend the cooling operation of the first one of the plurality of indoor units.

2. The air conditioning apparatus according to claim 1, wherein a number of the at least one of the indoor units that are forcibly suspended is based on a lower limit capacity value of the compressor of the outdoor unit.

3. The air conditioning apparatus according to claim 1, wherein the control device is configured to: upon a second determination that the sum of each of the plurality of the indoor units which, have the detected suction air temperature that is less than or equal to the predefined temperature and that is greater than the thermo-off temperature, is greater than or equal to the predetermined value, among the plurality of indoor units that have not been suspended since the first determination, forcibly suspend the cooling operation of the heating operation of at least one of the indoor units that have suction air temperatures which are less than or equal to the predefined temperature and greater than the thermo-off temperature.

4. The air conditioning apparatus according to claim 3, wherein among the indoor units which have not been forcibly suspended and have a suction air temperature greater than the predefined temperature and less than or equal to the thermo-on temperature, forcibly suspend the cooling operation or the heating operation.

5. The air conditioning apparatus according to claim 1, wherein the control device is configured to: upon a second determination that the sum of each of the plurality of the indoor units which have the detected suction air temperature that is less than or equal to the predefined temperature and that is greater than the thermo-off temperature, is greater than or equal to the predetermined value, among the at least one indoor unit that have been forcibly suspended, forcibly restart the cooling operation or the heating operation.

6. The air conditioning apparatus according to claim 5, wherein the control device is configured to forcibly restart the at least one indoor unit upon determining that the suction air temperature of the at least one indoor unit is greater than the predefined temperature and less than or equal to the thermo-on temperature.

7. An air conditioning apparatus, comprising:
an outdoor unit equipped with a compressor;
a plurality of indoor units connected with the outdoor unit and each including an expansion valve; and
a controller configured to:
detect respective suction air temperatures for each of the plurality of indoor units,
determine, for each of the plurality of indoor units, if the respective suction air temperature reaches a thermo-off temperature for a cooling operation and if the respective suction air temperature reaches the thermo-off temperature for the cooling operation, suspend the cooling operation,
determine, for each of the plurality of indoor units, if the respective suction air temperature reaches a thermo-on temperature for the cooling operation and if the respective suction air temperature reaches the thermo-on temperature for the cooling operation, begin the cooling operation,
the controller configured to periodically determine a sum of each of the plurality of the indoor units for which the respective suction air temperature is less than or equal to a predefined temperature and for which the respective suction air temperature is greater than the thermo-off temperature and upon determining that the sum is greater than a predetermined value, determine a first one of the plurality of indoor units that has a suctioned air temperature closest to the predefined temperature among the plurality of indoor units for which the suction air temperature is less than or equal to the predefined temperature and greater than the thermo-off temperature, and adjust the expansion valve of the determined first indoor unit to reduce a flow of refrigerant that flows through the at least one indoor unit to lower the cooling capacity of the at least one indoor unit.

8. An air conditioning apparatus, comprising:
an outdoor unit equipped with a compressor;
a plurality of indoor units connected with the outdoor unit;
a controller configured to:
detect a respective suction air temperatures for each of the plurality of indoor units,
determine, for each of the plurality of indoor units, if the respective suction air temperature reaches a thermo-off temperature for a heating operation and if the respective suction air temperature reaches the thermo-off temperature for the heating operation, suspend the heating operation,
determine, for each of the plurality of indoor units, if the respective suction air temperature reaches a thermo-on temperature for the heating operation and if the respective suction air temperature reaches the thermo-on temperature for the heating operation, begin the heating operation, and
determine a sum of each of the plurality of indoor units for which the respective suction air temperature is greater than or equal to a predefined temperature and less than the thermo-off temperature and if the sum is greater than or equal to a predetermined value, determine a first one of the plurality of indoor units whose respective suction air temperature is closest to the predefined temperature among the plurality of indoor units for which the respective suction air temperature is greater than or equal to the predefined temperature and less than the thermo-off temperature, and forcibly suspend the heating operation for the first one of the plurality of indoor units.

9. An air conditioning apparatus, comprising:
an outdoor unit equipped with a compressor;
a plurality of indoor units connected with the outdoor unit and each including an expansion valve; and
a controller configured to:
detect respective suction air temperatures for each of the plurality of indoor units,
determine, for each of the plurality of indoor units, if the respective suction air temperature reaches a thermo-off temperature for a heating operation and if the respective suction air temperature reaches the thermo-off temperature for the heating operation, suspend the heating operation,
determine, for each of the plurality of indoor units, if the respective suction air temperature reaches a thermo-on temperature for the heating operation and if the respective suction air temperature reaches the thermo-on temperature for the heating operation, begin the heating operation, and
the controller configured to periodically determine a sum of each of the plurality of indoor units for which the respective suction air temperature is greater than or equal to a predefined temperature and for which the respective suction air temperature is less than the thermo-off temperature and upon determining that the sum is greater than a predetermined value determine a first one of the plurality of indoor units that has a suctioned air temperature closest to the predefined temperature among the plurality of indoor units for which the suction air temperature is less than or equal to the predefined temperature and greater than the thermo-off temperature, and adjust the expansion valve of the determined first indoor unit to reduce a flow of refrigerant that flows through the at least one indoor unit to lower the cooling capacity of the at least one indoor unit.

10. The air conditioning apparatus according to claim 1, wherein the predetermined value is two or more.

11. The air conditioning apparatus according to claim 7, wherein the predetermined value is two or more.

12. The air conditioning apparatus according to claim 8, wherein the predetermined value is two or more.

13. The air conditioning apparatus according to claim 9, wherein the predetermined value is two or more.

14. The air conditioning apparatus according to claim 1, wherein the controller is configured to:
store a first flag in association with the first indoor unit, and
upon determining that the sum of each of the plurality of the indoor units which have the detected suction air temperature that is less than or equal to the predefined temperature and that is greater than the thermo-off temperature, is greater than or equal to a predetermined value, forcibly restart the suspended cooling operation or the heating operation, remove the first flag and store a second flag in association with the first indoor unit.

15. The air conditioning apparatus according to claim 7, wherein the controller is configured to:

store a first flag in association with the first indoor unit, and upon determining that the sum of each of the plurality of the indoor units which have the detected suction air temperature that is less than or equal to the predefined temperature and that is greater than the thermo-off temperature, is greater than or equal to a predetermined value, forcibly restart the suspended cooling operation or the heating operation, remove the first flag and store a second flag in association with the first indoor unit.

* * * * *